US012718088B2

(12) United States Patent
Dorado et al.

(10) Patent No.: US 12,718,088 B2
(45) Date of Patent: Aug. 25, 2026

(54) DESIGNING LADDER AND LAGUERRE ORTHOGONAL RECURRENT NEURAL NETWORK ARCHITECTURES INSPIRED BY DISCRETE-TIME DYNAMICAL SYSTEMS

(71) Applicants: INTERNATIONAL BUSINESS MACHINES CORPORATION, Armonk, NY (US); Rensselaer Polytechnic Institute, Troy, NY (US)

(72) Inventors: Sergio Dorado, Yorktown Heights, NY (US); Bhanukiran Vinzamuri, Long Island City, NY (US); Luigi Vanfretti, Troy, NY (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 1053 days.

(21) Appl. No.: 17/539,184

(22) Filed: Nov. 30, 2021

(65) Prior Publication Data

US 2023/0169327 A1 Jun. 1, 2023

(51) Int. Cl.
*G06N 3/08* (2023.01)
*G06F 17/16* (2006.01)
(Continued)

(52) U.S. Cl.
CPC ............... *G06N 3/08* (2013.01); *G06F 17/16* (2013.01); *G06N 3/044* (2023.01); *G06N 3/048* (2023.01)

(58) Field of Classification Search
CPC .......... G06N 3/08; G06N 3/048; G06N 3/044; G06F 17/16
See application file for complete search history.

(56) References Cited

U.S. PATENT DOCUMENTS 7,895,140 B2 2/2011 Nagashima
10,885,435 B2 1/2021 Xiong et al.
(Continued)

FOREIGN PATENT DOCUMENTS

CN 111598329 A 8/2020

OTHER PUBLICATIONS

Zhang et al. (Growing Algorithm of Laguerre Orthogonal Basis Neural Network with Weights Directly Determined, Springer, published 2008, pp. 60-67). (Year: 2008).*
(Continued)

*Primary Examiner* — Tan H Tran
(74) *Attorney, Agent, or Firm* — CHIP LAW GROUP

(57) ABSTRACT

A method and system for making a prediction with a recurrent neural network (RNN) of a discrete-time linear time-invariant system can receive, as an input into a recurrent neural network cell, a memory flow, an external input, a state flow and a hidden output flow. The RNN can compute an updated state flow by a linear combination of the external input and the memory flow constrained by a first matrix and a second matrix, wherein the first matrix and the second matrix correspond to a Laguerre orthogonal basis. The RNN can further compute, from the updated state flow using a coordinate matrix, an updated memory flow. The RNN can then apply an activation function on the hidden output flow to produce an updated hidden output flow and an output flow from a weighted sum of the hidden output flow, the updated state flow and the updated memory flow.

15 Claims, 5 Drawing Sheets

(51) Int. Cl.
*G06N 3/044* (2023.01)
*G06N 3/048* (2023.01)

(56) References Cited

U.S. PATENT DOCUMENTS

| | | | | |
|---|---|---|---|---|
| 2014/0355776 | A1* | 12/2014 | Park | G10L 21/0208 381/71.2 |
| 2019/0130271 | A1 | 5/2019 | Narang et al. | |
| 2021/0089912 | A1* | 3/2021 | Voelker | G06N 3/049 |

OTHER PUBLICATIONS

Sussillo, D. et al., "Opening the Black Box: Low-Dimensional Dynamics in High-Dimensional Recurrent Neural Networks"; Neural computation (2013); vol. 25:3, pp. 626-649.
Le, Q. V. et al., "A SimpleWay to Initialize Recurrent Networks of Rectified Linear Units"; arXiv:1504.00941v2 (2015); 9 pgs.
Arjovsky, M. et al., "Unitary Evolution Recurrent Neural Networks"; arXiv:1511.06464v4 [cs.LG] (2016); 9 pgs.
Voelker, A.. R., "Legendre Memory Units: Continuous-Time Representation in Recurrent Neural Network"; 33rd Conference on Neural Information Processing Systems (NeurIPS—2019); 10 pgs.
Wang, L., Model Predictive Control System Design and Implementation Using MATLAB(R); Springer-Verlag London Limited (2009); 403 pgs (part 1 of 3—134 pgs).
Wang, L., Model Predictive Control System Design and Implementation Using MATLAB(R); Springer-Verlag London Limited (2009); 403 pgs (part 2 of 3—134 pgs).
Wang, L., Model Predictive Control System Design and Implementation Using MATLAB(R); Springer-Verlag London Limited (2009); 403 pgs (part 3 of 3—135 pgs).
Hwang, C. et al., "Analysis and Parameter Identification of Time-Delay Systems via Shifted Legendre Polynomials"; Int J. Control (1985); vol. 41:2, pp. 403-415.
Chandar, S. et al., "Towards Non-saturating Recurrent Units for Modelling Long-term Dependencies"; Association for the Advancement of Artificial (2019); 11 pgs.
Jing, L. et al., "Gated Orthogonal Recurrent Units: On Learning to Forget"; arXiv:1706.02761v3 [cs.LG] (2017); 7 pgs.
Vecoven, N. et al., "A Bio-Inspired Bistable Recurrent Cell Allows for Long-Lasting Memory"; arXiv:2006.05252v1 [cs.NE] (2020); 10 pgs.
Nagaraj, D. et al., "An RNN-Ensemble approach for Real Time Human Pose Estimation from Sparse IMUs"; APPIS (2020).

* cited by examiner

DESIGNING LADDER AND LAGUERRE ORTHOGONAL RECURRENT NEURAL NETWORK ARCHITECTURES INSPIRED BY DISCRETE-TIME DYNAMICAL SYSTEMS

BACKGROUND

Technical Field

The present disclosure generally relates to artificial intelligence and machine learning systems, and more particularly, to methods and systems for designing ladder and Laguerre orthogonal recurrent neural network architectures inspired by discrete-time dynamical systems.

Description of the Related Art

Discrete-time dynamical systems describe processes that evolve at discrete time instants where the current output depends on present and past values of the input. Normally, the historical information of the input is kept in the state of the system. The state $x_k$ is the information that, together with the input $u_k$ at instant k, is sufficient to determine uniquely the output at time k.

Dynamical systems show, in general, remarkable memory capabilities. If given the current inputs, a stable system can maintain a state for a long period of time (what is known as steady-state operation). This condition depends on all the previous values of the inputs and the outputs. Recurrent Neural Networks (RNNs) are a specific case of discrete-time dynamical systems that can suffer from long-term memory issues.

SUMMARY

According to various embodiments, a computing device, a non-transitory computer readable storage medium, and a method are provided for developing and improving a predictive model for asset failure where only the models are shared among different sites.

In one embodiment, a method for making a prediction with a recurrent neural network (RNN) can include receiving, as an input into a recurrent neural network cell, a memory flow, an external input, a state flow and a hidden output flow. The RNN can compute an updated state flow by a linear combination of the external input and the memory flow constrained by first matrix and a second matrix, the first matrix and the second matrix corresponding to a Laguerre orthogonal basis. The RNN can further compute, from the updated state flow using a coordinate matrix, an updated memory flow. The RNN can then apply an activation function on the hidden output flow to produce an updated hidden output flow and an output flow from a weighted sum of the hidden output flow, the updated state flow and the updated memory flow.

According to various embodiments, a computer implemented method of making a prediction with a recurrent neural network of a discrete-time linear time-invariant system can include receiving, as an input into a recurrent neural network cell, a memory flow, an external input, a state flow and a hidden output flow. The RNN can compute an updated state flow by a linear combination of the external input and the memory flow constrained by first matrix and a second matrix, the first matrix and the second matrix corresponding to a Laguerre orthogonal basis. The RNN can further compute, from the updated state flow using a coordinate matrix, an updated memory flow. The RNN can apply a weighting function to the updated memory flow to provide a weighted updated memory flow. Finally, the RNN can apply an activation function on the hidden output flow to produce an updated hidden output flow and an output flow from a weighted sum of the hidden output flow, the updated state flow and the weighted updated memory flow.

By virtue of the concepts discussed herein, a system and method are provided that improves upon the approaches currently used to predict asset failure. The system and methods discussed herein have the technical effect of improving the accuracy of asset failure prediction models by sharing information among different sites without compromising privacy and security.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Figure 1:
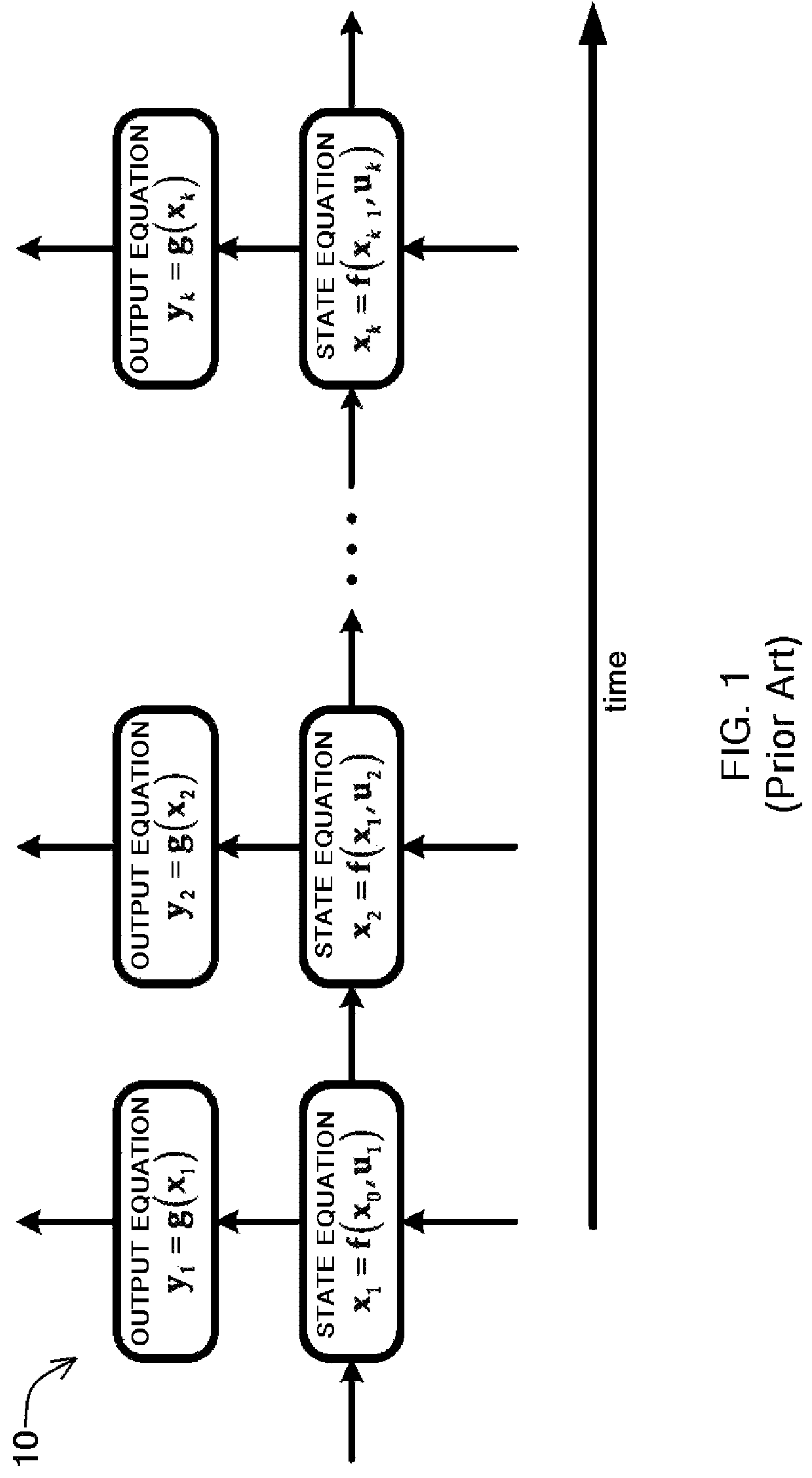
FIG. 1 is a representation of conventional discrete-time dynamical system whose parameters do not vary on time.

FIG. 1 illustrates a representation of a discrete-time dynamical system 10 whose parameters do not vary on time. The representation includes a set of nonlinear difference equations that can be decoupled into a dynamic state equation and a static output equation at each time step.

The introduction of Legendre Memory Units (LMUs) represented a deep connection between Neural Networks (NNs) and dynamical systems. An LMU improves the memory capability of a RNN by introducing dynamics directly to update of the memory cell. The updated memory $m_{k+1}$ is computed through the state equation of a linear time-invariant system with state-space representation (A, B)

$$m_{k+1}=Am_k+Bu_k.$$

For an LMU, the state-space matrices (A, B) with $A\in^{N\times N}$ and $B\in R^{N\times 1}$ correspond to shifted Legendre polynomials, a complete set of orthogonal functions.

The orthogonal time-domain projection inside LMUs improves memory capabilities and reduces the number of trainable parameters. Nevertheless, LMUs only make use of the state equation. The output equation (i.e., $y_k=Cx_k$) does not appear within their structure. The use of this equation inside a RNN becomes even more relevant if the (A, B) pair represents an orthogonal family of functions, such as shifted Legendre polynomials.

The teachings herein provide an approach to develop and improve recurrent neural network architectures that embed a linear time-invariant system basis comprising Laguerre polynomials inside its structure.

Laguerre Functions $\ell_i$ are a family of eigenfunctions of the Sturm-Liouville problem (i=1, 2, . . . ) characterized by their orthonormality. They are another complete set over [0, ∞) that can be employed as an orthogonal basis to reconstruct any stable linear time-invariant system. Moreover, their matrix state-space representation (A, B) is sparse.

As discussed in greater detail below, the present disclosure generally relates to a RNN architecture inspired by discrete-time dynamical systems. The architecture can include three main pipelines: a state flow x, a memory flow m and a hidden output flow h. The architecture can have an embedded state-space transformation based on an orthonormal basis, such as Laguerre functions, also referred to as Laguerre polynomials, based on which the memory cell is dynamically updated. The architecture can create a RNN where the time evolution of the memory flow can be constrained by a linear time-invariant system policy update. The linear time-invariant representation can include an orthonormal basis, such as Laguerre polynomials, which can increase generalization capabilities to represent real-world patterns of sampled-data and reduce the number of trainable parameters due to its sparse characteristics. Typically, for a matrix to qualify as sparse, the number of non-zero elements is roughly equal to the number of rows or columns. In some embodiments, the architecture can introduce discrete-time delay dynamics to solve long-term memory problems.

The general-purpose RNN architecture described herein can achieve state-of-the-art performance in complex benchmark tasks with a reduced number of parameters compared with conventional architectures. Such a design can result in systems with improved performance and requiring fewer computational resources. As discussed below, the RNN architecture can learn, from input data and previous states, the most convenient dynamical representation to update the memory policy while minimizing an application-specific loss function.

In some embodiments, the architecture can use state-space representations of linear time-invariant systems to update the memory cell dynamically through time. In this case, a full state-space representation is introduced inside the architecture, which differs from Legendre Memory Units, which do not use the output equation. This causes the memory to be a signal containing the information of its previous state and previous outputs for a long-term horizon.

In some embodiments, the architecture can take advantage of the state-space representation of Laguerre polynomials. The orthonormal characteristic of this family of functions makes it possible to represent any complex system (or signal) with a unique set of coordinates. Moreover, the sparse nature of Laguerre polynomials leads to a reduced-parameter representation which can be, in turn, translated into a reduced number of trainable parameters inside a RNN.

In some embodiments, the architecture can tackle directly the long-term memory by using the RNN architecture with specific dynamics. The introduction of discrete-time delays can help solve the problem of arbitrarily long-sequences through time thanks to the mathematical simplicity of delay models in discrete-time.

Laguerre matrix representations are sparse, which is an advantage with respect to Legendre Memory Units. In fact, if $A\in R^{N\times N}$ its sparsity, measured by the ratio of zero entries to the total number of elements of the matrix, is:

$$s_A=\frac{\Sigma N-k}{N^2}=\frac{N-1}{2N}.$$

The numerical condition of this sparse representation deserves special attention. The Laguerre matrix A depends only on one parameter, a, which has to be within the range [0, 1) to maintain dynamical stability. The selection of a becomes fundamental for the numerical stability of the implementation.

Reference now is made in detail to the details illustrated in the accompanying drawings and discussed below.

Example Block Diagram

Figure 2:
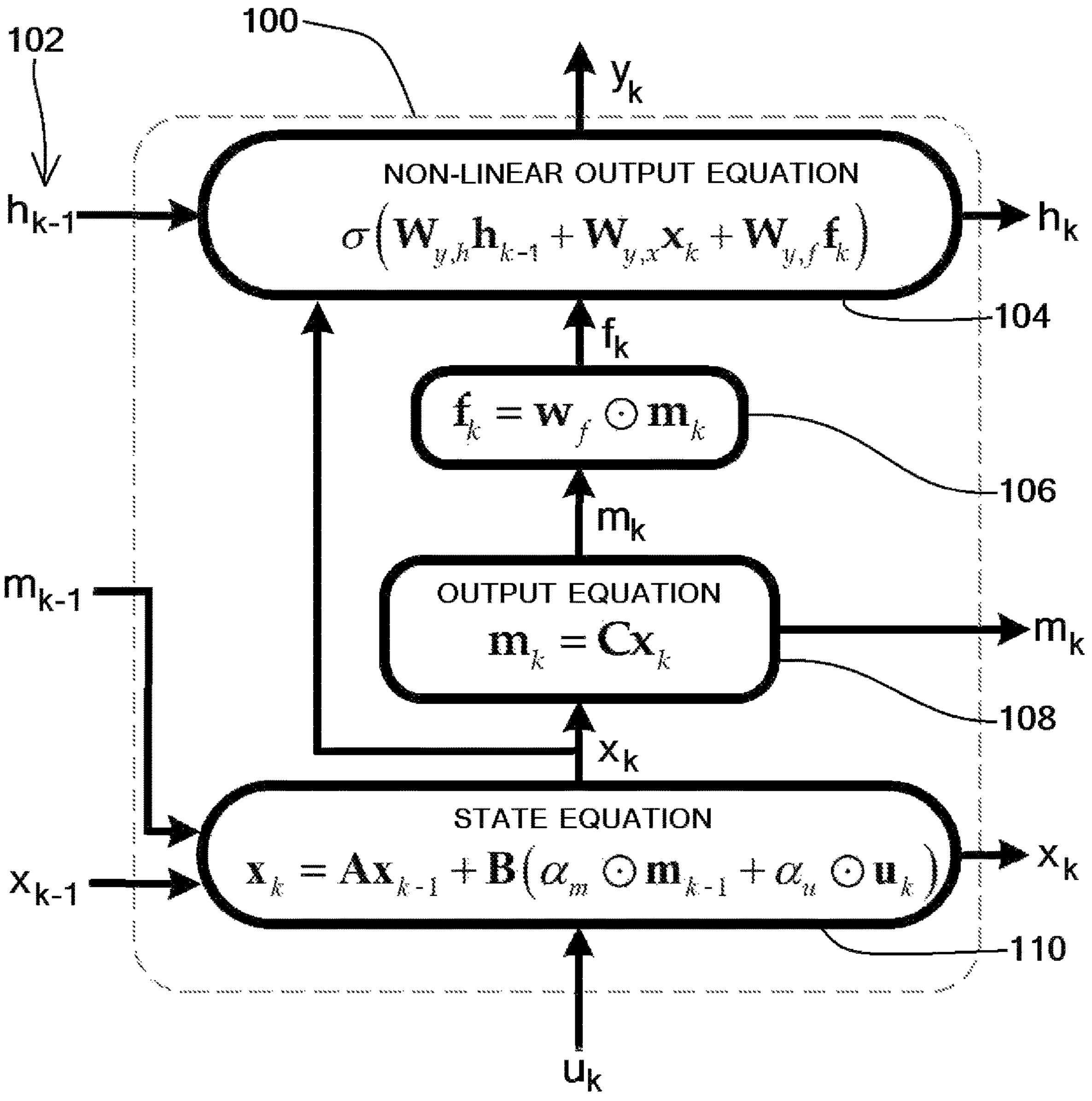
FIG. 2 is a representation of a recurrent neural network architectures that embeds a linear time-invariant system basis comprising Laguerre polynomials inside its structure, consistent with an illustrative embodiment.

Referring to FIG. 2, the inputs 102 to the recurrent neural network (RNN) cell 100 are the current external input $u_k$, the previous memory $m_{k-1}$ and the previous output $h_{k-1}$. A plurality of cells 100 may be calculated along a time, t. The state flow $x_k$, through the state equation layer 110, and the memory flow $m_k$, through the state equation layer 110 and the output equation layer 108, correspond to the state and the output of a discrete-time linear time-invariant system. The hidden output $h_k$ is computed through a static nonlinear output layer 104 with an activation function σ which uses information of the actual state and memory and the previous value of the hidden state.

The number of states (size of A) is independent from the number of outputs. Increasing the number of states enhances the generalization capabilities of the network by adding more Laguerre polynomials to their state equation.

The output layer 104 employs an activation function σ (e.g., tanh, sigmoid, softmax or the like) to produce a hidden state $h_k$ and an output $y_k$ from a weighted sum of the previous hidden state $h_{k-1}$, the system state $x_k$ and the weighted memory $f_k$. The memory vector of each cell is weighted locally by the network to enhance or attenuate the linear dynamical characteristic of the network. The memory is computed from the state x using a coordinate matrix C. This learnable parameter determines the characteristics of the linear time invariant (LTI) system which adjusts best to the task being performed by the RNN.

The state is driven by a weighted linear combination of the current input $u_k$ and the memory of the cell $m_{k-1}$ through the dynamics of the pair (A, B). These matrices correspond to a Laguerre orthonormal basis that can be used to represent any arbitrary stable discrete-time linear-time invariant system.

In FIG. 2, the blocks with trainable weights include the nonlinear output layer 104, the memory filtering layer 106 and the output equation layer 108. It should be noted that the memory is constrained to have the same dimensions as the input so that it can be used to store input information in the output of the dynamical system. The design is interpreted as follows: consider an input with nu features ($u_k \in \mathbb{R}^{n_u \times 1}$). The state the output equation constitute a discrete-time linear time-invariant (DTLTI) system that processes the past memory $m_{k-1}$, state $x_{k-1}$, and the current input $u_k$ to update the state $x_k$ by $x_k = Ax_{k-1} + B(u_k + m_{k-1})$ where $A \in \mathbb{R}^{n \times n}$ and $B \in \mathbb{R}^{n \times n_u}$ are discrete Laguerre matrices obtained after discretization of the continuous Laguerre matrices, n is the network order that corresponds to the number of Laguerre polynomials used to encode the DTLTI dynamics into the RNN. Once the state is updated, it is fed into the output equation layer 104 to compute the memory update $m_k$ through the learnable coordinate matrix C. The memory is filtered, in memory filter layer 106, elementwise by the local weight vector $w_f$ to produce $f_k$ which is fed into the nonlinear output layer 104.

The nonlinear output layer 104 produces $n_y$ hidden outputs through $h_k = y_k \in \mathbb{R}^{n_y \times 1}$. The logits are computed by the linear combination of the previous hidden output $h_{k-1}$, the updated state $x_k$ and memory $m_k$ through the weights $W_{y,h} \in \mathbb{R}^{n_y \times n_u}$, $W_{y,x} \in \mathbb{R}^{n_y \times n}$, $W_{y,f} \in \mathbb{R}^{n_y \times n_u}$ The logits are passed through a nonlinear activation function σ that counts with a bias term not shown in the diagram.

Figure 3:
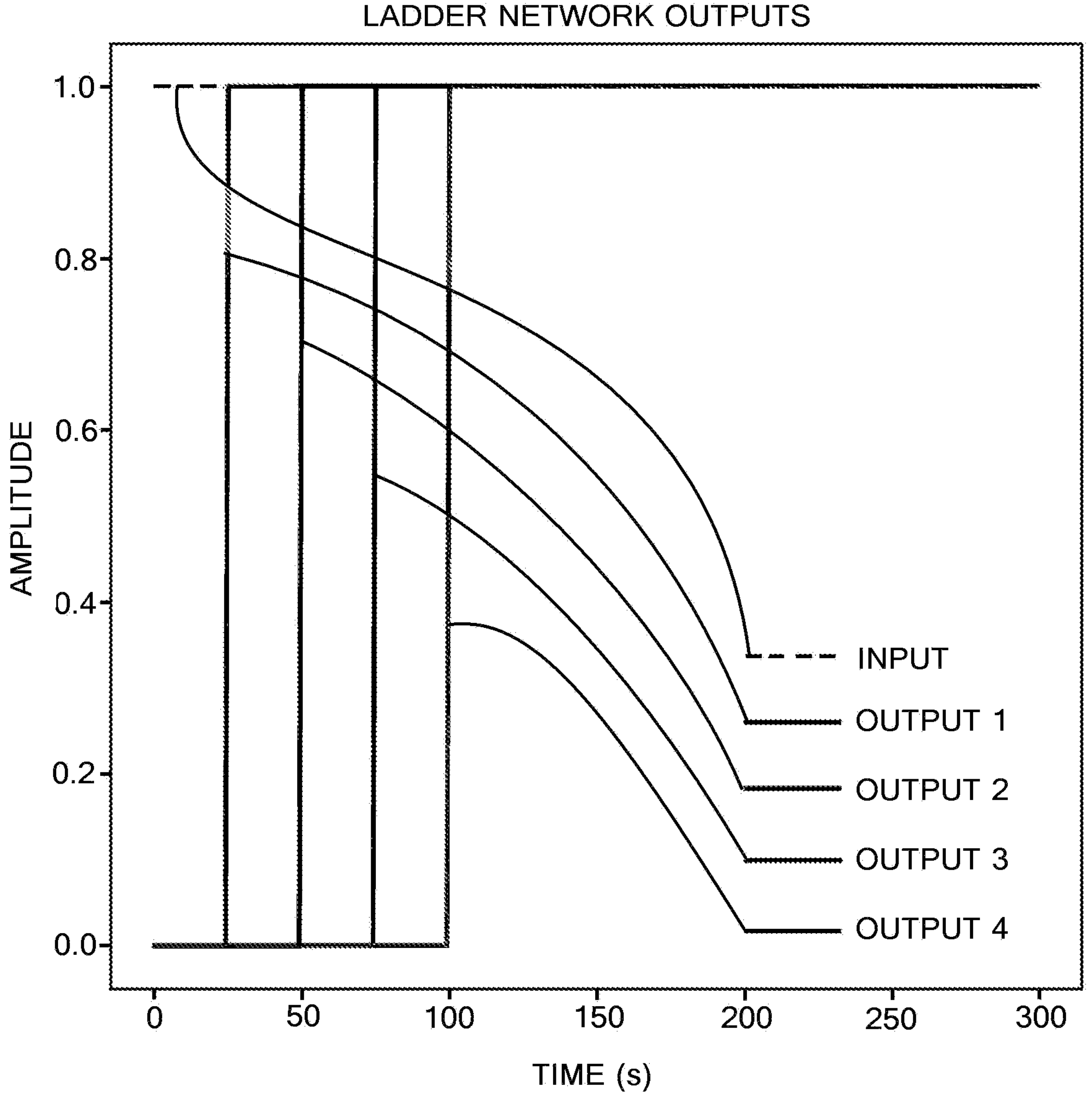
FIG. 3 is a representation of ladder network usable in the recurrent neural network architecture of FIG. 2.

Referring to FIG. 3, a ladder network 300 is a discrete-time dynamical system which is founded on the simple mathematical structure of the unit delay in the frequency domain. The transfer function can be expressed in a straightforward manner using a state-space matrix representation in terms of (A, B, C). The output of a square ladder network is a delayed version of the input in each channel by a specific delay. The delay network uses a specific Laguerre representation in terms of shifted unit impulses with a fixed dynamic behavior. For this reason, there is no trainable C matrix.

The Laguerre network uses a fixed pair (A, B) where $A = A_\ell$ and $B = B_\ell$. In other words, the RNN has to determine during training the coordinate matrix C that results most optimal to the task under consideration. For this architecture, the order n (i.e., the number of Laguerre polynomials) is left as a design hyperparameter. Further hyperparameters are the scaling factor p (default, p=1), the sampling time ΔT used for discretization (default, ΔT=1 s), and the sampling method (default, zero-order hold). The Ladder network employs discrete Laguerre networks with α=0 to introduce discrete time (DT) delay dynamics inside the RNN. For this reason, the matrices (A, B, C) are non-trainable (i.e., the coefficient matrix C is fixed). In fact, (A, B, C) correspond to a state-space realization for the Ladder system $$G(z) = \mathrm{diag}\left(\frac{1}{z^{mi}}\right) \in \mathbb{C}^{n_u \times n_u}$$

where $m_1, m_2, \ldots m_{n_{u-1}}, m_{n_u}$ are the delays of each channel, fulfilling $m_1 < m_2 < \ldots < m_{n_u}$, where $m_{n_u} = m_d$, the maximum delay, which is specified by the user. Using this input, the algorithm to construct the Ladder network in transfer function form distributes the delays $m_1, m_2, \ldots m_{n_{u-1}}$ equally among all the input channels. For example, for a system with 100 inputs and a maximum delay of 100, G(z) has the form of a diagonal matrix with the element in $d^{th}$ row and column being $1/z^{m_d}$.

Once the matrix G(z) is constructed, it is transformed into controllable-canonical form. The resulting matrices (A, B, C) are set inside the RNN architecture, as illustrated in FIG. 2, to construct the Ladder variant.

Example Process

Figure 4:
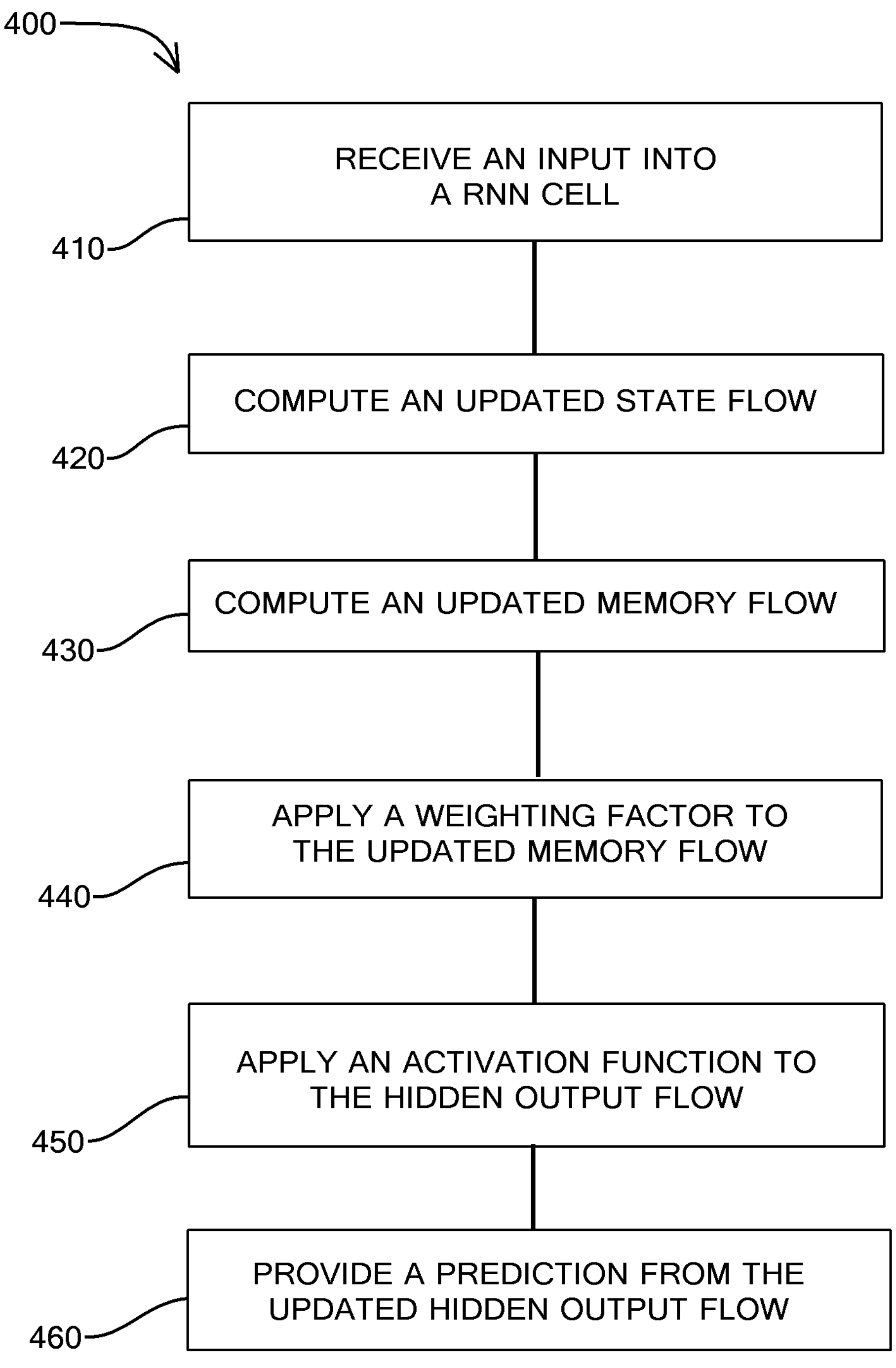
FIG. 4 is a flow chart illustrating acts involved with operating a recurrent neural network architecture, consistent with an illustrative embodiment.

With the foregoing overview of the example RNN cell 100 (see FIG. 2), it may be helpful now to consider a high-level discussion of example processes. To that end, FIG. 4 presents an illustrative process 400 related to the methods for using the RNN cell 100 for making a prediction. Process 400 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 4, the process 400 for making a prediction in a RNN system includes an act 410 of receiving an input into a RNN cell. This input can include a memory flow, an external input, a state flow and a hidden output flow. The process 400 can further include an act 420 of computing an updated state flow. This computation can be from a linear combination of the external input and the memory flow constrained by first matrix and a second matrix, the first matrix and the second matrix corresponding to a Laguerre orthogonal basis. The process 400 can further include an act 430 of computing an updated memory flow from the updated state flow using a coordinate matrix. The process 400 can further include an act 440 of applying a weighting function to the updated memory flow to provide a weighted updated memory flow. The process 400 can further include an act 450 of applying an activation function on the hidden output flow to produce an updated hidden output flow and an act 460 of providing a prediction as an output flow from a weighted sum of the hidden output flow, the updated state flow and the weighted updated memory flow.

Example Computing Platform

Figure 5:
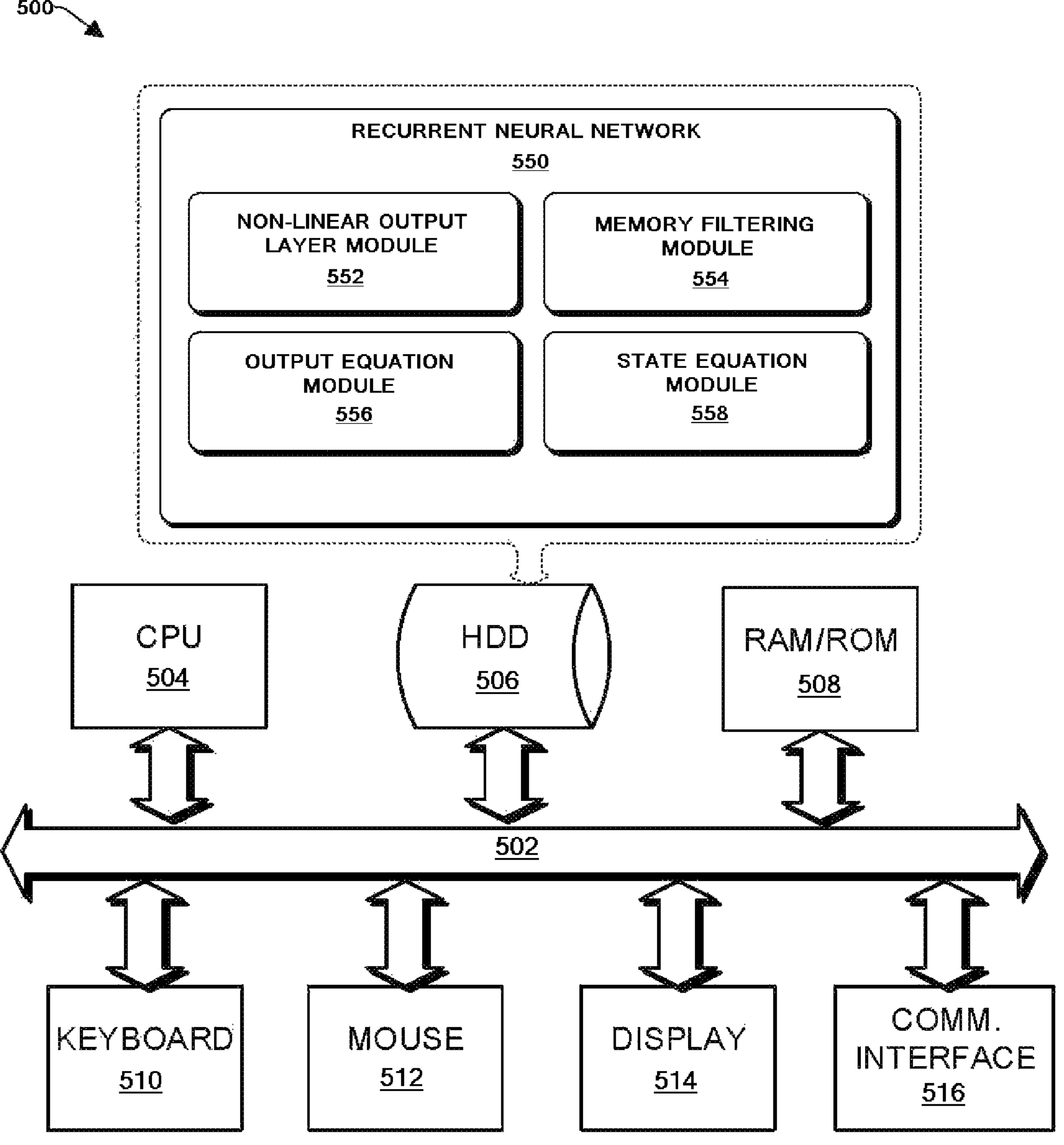
FIG. 5 is a functional block diagram illustration of a computer hardware platform that can be used to implement the recurrent neural network architecture of FIG. 2.

FIG. 5 provides a functional block diagram illustration of a computer hardware platform 500 that can be used to implement a particularly configured computing device that can host a recurrent neural network (RNN) cell 550, such as RNN cell 100, described above. The RNN cell 550 can include a nonlinear output layer module 552, including the nonlinear output layer 104, described above; a memory filtering module 554, such as the memory filtering layer 106, described above; an output equation module 556, such as output equation layer 108, described above; and a state equation module 558, such as state equation layer 110, described above.

The computer platform 500 may include a central processing unit (CPU) 510, a hard disk drive (HDD) 520, random access memory (RAM) and/or read only memory (ROM) 530, a keyboard 550, a mouse 560, a display 570, and a communication interface 580, which are connected to a system bus 540.

In one embodiment, the HDD 520, has capabilities that include storing a program that can execute various processes, such as the RNN cell 550, in a manner described herein.

EXAMPLES

To benchmark the proposed architecture against other RNN types, the following experiments are proposed:

| Dataset | Task | Performance Metric | Dimensionality | Time Stamps (length) | Instances | Number of Classes |
|---|---|---|---|---|---|---|
| psMNIST | Sequential Multi-class Classification Task | Validation and testing accuracy | 1 | 784 | 70000 | 10 |
| Chlorine Concentration | Univariate Time-Series Multi-class Classification | F1 over 5-folds | 1 | 166 | 4307 | 3 |
| PenDigits | Multivariate Time-Series Multi-class Classification | F1 over 5-folds | 2 | 8 | 10992 | 10 |
| Phoneme Spectra | Multivariate Time-Series Multi-class Classification | F1 score over 5-folds | 11 | 217 | 6688 | 39 |
| Wafer | Binary Time-Series Classification | F1 score and AUROC over 5-folds | 1 | 152 | 7164 | 2 |

For all benchmarks, the architectures are implemented using the continuous-time Laguerre (continuous-time formulation followed by a discretization step) and the discrete-time Ladder network variants, according to embodiments of the present disclosure. Each metric was evaluated over 5-fold, except as noted.

TABLE 1

Results for the psMNIST dataset

| Dataset | Metric | LSTM * | GORU * | BRC | nBRC | NRU * | LMU | Laguerre | Ladder Network |
|---|---|---|---|---|---|---|---|---|---|
| psMNIST | Validation Accuracy (%) | 90.01 | 86.90 | 58.24 | 90.21 | 95.46 | 96.25 | 97.02 | 96.86 |
| | Testing Accuracy (%) | 89.86 | 87.00 | 58.78 | 90.31 | 95.38 | 96.73 | 97.25 | 97.29 |

Table 1 shows the comparative examples of long short-term memory (LSTM), gated orthogonal recurrent units (GORU) and non-saturating recurrent units (NRU) are literature data, while bistable recurrent cell (BRC), neuromodulated bistable recurrent cell (nBRC) and LMU comparative examples are based on experimental results. As can be seen, the Laguerre model and the ladder network model, according to embodiments of the present disclosure, provide the best result in the psMNIST dataset with respect to validation accuracy and testing accuracy metrics.

Table 2, below, presents data for various RNN models, including the Laguerre and Ladder Network models according to embodiments of the present disclosure. As can be seen, the methods according to embodiments of the present disclosure provide consistently good, if not the best, scores on the F 1 metric and the AUROC metric, except in the case of the Phoneme Spectra dataset, where the F 1 metric results in a consistently low score across all RNN models.

TABLE 2

Results for Chlorine Concentration, PenDigits, PhonemeSpectra and Wafer datasets

| Dataset | Metric | LSTM | BRC | nBRC | LMU | Laguerre | Ladder Network |
|---|---|---|---|---|---|---|---|
| Chlorine Concentration | F1 | 0.3685 ± 0.0408 | 0.2956 ± 0.0350 | 0.5888 ± 0.2433 | 0.9990 ± 0.0009 | 0.9981 ± 0.0026 | 0.9986 ± 0.0015 |
| PenDigits | | 0.9976 ± 0.0028 | 0.9966 ± 0.0020 | 0.9976 ± 0.0008 | 0.9968 ± 0.0027 | 0.9626 ± 0.0157 | 0.9958 ± 0.0023 |

TABLE 2-continued

Results for Chlorine Concentration, PenDigits, PhonemeSpectra and Wafer datasets

| Dataset | Metric | LSTM | BRC | nBRC | LMU | Laguerre | Ladder Network |
|---|---|---|---|---|---|---|---|
| Phoneme Spectra | | 0.3220 ± 0.0791 | 0.1068 ± 0.0304 | 0.2725 ± 0.0688 | 0.2983 ± 0.1657 | 0.1612 ± 0.0753 | 0.1428 ± 0.0559 |
| Wafer | | 0.9634 ± 0.0408 | 0.8731 ± 0.0361 | 0.9791 ± 0.0047 | 0.8731 ± 0.0361 | 0.9955 ± 0.0030 | 0.9960 ± 0.0024 |
| | AUROC | 0.9569 ± 0.0361 | 0.8269 ± 0.0486 | 0.9840 ± 0.0067 | 0.8731 ± 0.0361 | 0.9964 ± 0.0044 | 0.9978 ± 0.0018 |

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of predicting a failure of an asset with a recurrent neural network (RNN) in a computationally efficient way, the computer-implemented method comprising:

receiving, as an input into a recurrent neural network cell, a memory flow, an external input, a state flow, and a hidden output flow;

adding a unit delay in a frequency domain of the external input;

computing, based on the adding of the unit delay, an updated state flow by a linear combination of the external input and the memory flow, wherein the linear combination is constrained by a first matrix and a second matrix, the first matrix and the second matrix correspond to a Laguerre orthogonal basis, and the Laguerre orthogonal basis is sparse;

computing, from the updated state flow using a coordinate matrix, an updated memory flow, wherein the updated memory flow is dynamically optimized based on a Laguerre-based filtering mechanism to reduce a long-term dependency error in the RNN; and predicting the failure of the asset by applying an activation function on the hidden output flow to produce an updated hidden output flow and an output flow from a weighted sum of the hidden output flow, the updated state flow, and the updated memory flow.

2. The computer-implemented method of claim 1, wherein the coordinate matrix is a learned parameter adjusted to optimize the prediction.

3. The computer-implemented method of claim 1, further comprising weighting the memory flow to attenuate a linear dynamical characteristic of the RNN.

4. The computer-implemented method of claim 3, wherein the weighting of the memory flow is learned from the external input and the state flow to maximize a prediction metric while minimizing an application-specific loss function.

5. The computer-implemented method of claim 1, further comprising applying a weighting function to the updated memory flow to provide a weighted updated memory flow as input to the activation function.

6. The computer-implemented method of claim 1, wherein the prediction is performed in a discrete-time linear time-invariant system.

7. The computer-implemented method of claim 1, wherein a number of states, represented by a size of the first matrix, is independent from a number of outputs in the output flow.

8. The computer-implemented method of claim 1, wherein the coordinate matrix is fixed and non-trainable.

9. A computer-implemented method of predicting a failure of an asset with a recurrent neural network (RNN) of a discrete-time linear time-invariant system in a computationally efficient way, the computer-implemented method comprising:

receiving, as an input into a recurrent neural network cell, a memory flow, an external input, a state flow, and a hidden output flow;

adding a unit delay in a frequency domain of the external input;

computing, based on the adding of the unit delay, an updated state flow by a linear combination of the external input and the memory flow, wherein the linear combination is constrained by a first matrix and a second matrix, the first matrix and the second matrix correspond to a Laguerre orthogonal basis, and the Laguerre orthogonal basis is sparse;

computing, from the updated state flow using a coordinate matrix, an updated memory flow, wherein the updated memory flow is dynamically optimized based on a Laguerre-based filtering mechanism to reduce a long-term dependency error in the RNN;

applying a weighting function to the updated memory flow to provide a weighted updated memory flow; and predicting the failure of the asset by applying an activation function on the hidden output flow to produce an updated hidden output flow and an output flow from a weighted sum of the hidden output flow, the updated state flow, and the weighted updated memory flow.

10. The computer-implemented method of claim 9, wherein the coordinate matrix is a learned parameter adjusted to optimize the prediction.

11. The computer-implemented method of claim 9, further comprising weighting the memory flow to attenuate a linear dynamical characteristic of the RNN.

12. A non-transitory computer readable storage medium tangibly embodying a computer readable program code having computer readable instructions that, when executed, cause a computer device to carry out a method of predicting a failure of an asset with a recurrent neural network (RNN) of a discrete-time linear time-invariant system in a computationally efficient way, the method comprising:

receiving, as an input into a recurrent neural network cell, a memory flow, an external input, a state flow, and a hidden output flow;

adding a unit delay in a frequency domain of the external input;

computing, based on the adding of the unit delay, an updated state flow by a linear combination of the external input and the memory flow, wherein the linear combination is constrained by a first matrix and a second matrix, the first matrix and the second matrix correspond to a Laguerre orthogonal basis, and the Laguerre orthogonal basis is sparse;

computing, from the updated state flow using a coordinate matrix, an updated memory flow, wherein the updated memory flow is dynamically optimized based on a Laguerre-based filtering mechanism to reduce a long-term dependency error in the RNN;

applying a weighting function to the updated memory flow to provide a weighted updated memory flow; and predicting the failure of the asset by applying an activation function on the hidden output flow to produce an updated hidden output flow and an output flow from a weighted sum of the hidden output flow, the updated state flow, and the weighted updated memory flow.

13. The non-transitory computer readable storage medium of claim 12, wherein the coordinate matrix is a learned parameter adjusted to optimize the prediction.

14. The non-transitory computer readable storage medium of claim 12, wherein the method further comprises weighting the memory flow to attenuate a linear dynamical characteristic of the RNN.

15. The non-transitory computer readable storage medium of claim 12, wherein a number of states, represented by a size of the first matrix, is independent from a number of outputs in the output flow.

* * * * *